United States Patent [19]

Haukkavaara et al.

[11] Patent Number: 5,761,245

[45] Date of Patent: Jun. 2, 1998

[54] METHOD AND A SYSTEM FOR REDUNDANCY CONTROL OF BASEBAND CHANNELS IN A TELECOMMUNICATIONS SYSTEM

[75] Inventors: Ilkka Haukkavaara, Kerava; Jari Ihatsu, Helsinki, both of Finland

[73] Assignee: Nokia Telecommunications Oy, Espoo, Finland

[21] Appl. No.: 604,959

[22] PCT Filed: Aug. 24, 1994

[86] PCT No.: PCT/FI94/00372

§ 371 Date: Apr. 19, 1996

§ 102(e) Date: Apr. 19, 1996

[87] PCT Pub. No.: WO95/06363

PCT Pub. Date: Mar. 2, 1995

[30] Foreign Application Priority Data

Aug. 25, 1993 [FI] Finland .................. 933742

[51] Int. Cl.$^6$ .................. H04B 7/02
[52] U.S. Cl. .................. 375/267; 375/220; 375/347; 370/225; 370/228; 370/248; 340/825.16
[58] Field of Search .................. 370/216, 221, 370/225–228, 242–248; 340/825.03, 825.06, 825.16, 827, 825.01; 371/68.2; 375/211, 213, 219, 220, 224, 260, 349, 267, 347

[56] References Cited

U.S. PATENT DOCUMENTS 4,858,224 8/1989 Nakano et al. .
4,896,317 1/1990 Nakama et al. .
4,953,197 8/1990 Kaewell, Jr. et al. .
5,034,966 7/1991 Hochstein .

FOREIGN PATENT DOCUMENTS 2 250 894 6/1992 European Pat. Off. .
0 492 438 7/1992 European Pat. Off. .

OTHER PUBLICATIONS

Patent Abstracts of Japan, vol. 13, No. 444, E–828, Abstract of JP,A, 1–170124 (NEC Corp.), 5 Jul. 1989.
Patent Abstract of Japan, vol. 10, No. 283, E–440, Abstract of JP,A, 61–101134 (Kokusai Electric Co Ltd), 20 May 1986.
Derwent's abstract, No. 88–248643/35, week 8835, Abstract of SU, 1374435 (Shabanov A P), 15 Feb. 1988.

Primary Examiner—Stephen Chin
Assistant Examiner—Amanda T. Le
Attorney, Agent, or Firm—IP Group of Pillsbury Madison Sutro LLP

[57] ABSTRACT

A method and a system for performing redundancy control of the baseband primary channel interfaces of a plurality of mutually substantially identical receivers in a digital transmission device, such as a radio link, including: monitoring the quality of a signal received from the transmission line; monitoring a possible failure indication or alarm signal concerning the transmission direction at the far end; performing a failure situation comparison between the mutually redundant receivers; and performing redundancy control of the baseband primary channel interfaces of the receivers on the basis of the failure situation comparison so that the signal of higher quality of the output signals of the receivers is transmitted towards the primary channel.

6 Claims, 1 Drawing Sheet

METHOD AND A SYSTEM FOR REDUNDANCY CONTROL OF BASEBAND CHANNELS IN A TELECOMMUNICATIONS SYSTEM

This application claims benefit of International application PCT/FI94/00372, filed Aug. 24, 1994.

BACKGROUND OF THE INVENTION

This invention relates to a method and a system for performing redundancy control of baseband primary channel interfaces of mutually substantially identical receivers in a digital transmission device, such as a radio link.

Redundant transmission devices, which typically use two identical transmitters and receivers connected in parallel, e.g. a radio link, and a baseband branching means connected to them (so-called 1+1 redundancy), operate in both the inbound and outbound direction of a telecommunications network. The selection of the radio device to be used in each particular instance usually depends on which one of the devices produces the signal of the highest quality.

In so-called frequency redundancy, device redundancy is realized by having two signals of different frequencies propagating between the near end and far end, i.e. the system comprises two transmitter-receiver pairs operating at different frequencies. So-called polarization redundancy is analogous, but it carries two signals having different polarizations.

By using a changeover control method, the control of device redundancy of a radio link jump secured by frequency or polarization redundancy is effected, i.e. a reliable and simple device redundancy (not hitless) for the radio link jump.

In the prior-art changeover control methods, the signal received by the less faulty receiver is selected as a line signal. At the far end, it may happen that one of the transmitters is faulty, and therefore forwards an alarm signal AIS (Alarm Indication Signal), whereas the stand-by transmitter is completely faultless. A drawback of the known methods is that as radio links do not usually identify the information content of a signal to be transmitted, a received AIS signal will not bring about failure detection in the radio link, and so it is quite possible that the AIS signal is selected for transmission to the line, even though the stand-by signal would be faultless.

SUMMARY OF THE INVENTION

The object of this invention is to eliminate the draw backs of the above-mentioned known methods. To achieve this, the method according to the invention is characterized in that the method comprises the following steps:

monitoring the quality of a signal received from the transmission line;

monitoring a possible failure indication or alarm signal concerning the transmission direction at the far end;

performing a failure situation comparison between the mutually redundant receivers;

performing redundancy control of the baseband primary channel interfaces of the receivers on the basis of the failure situation comparison so that the signal with higher quality of the output signals of the receivers will be transmitted towards the primary channel.

The method according to the invention has the following advantages:

the changeover control method according to the invention allows reliable and simple device redundancy to be realized for a radio link jump with no other external changeover control means than a passive baseband branching means and cabling between the redundant pair;

reception and transmission may take place over different pairs of the redundant link jump, whereby transmission of one pair and reception of the other pair may fail without a break in the connection in either direction; and the method according to the invention can be used in any transmission device using a baseband branching means and a connection between far-end and near-end control means.

BRIEF DESCRIPTION OF THE DRAWINGS

In the following the invention will be described more fully by way of example with reference to the attached drawing, in which.

DETAILED DESCRIPTION

Figure 1:
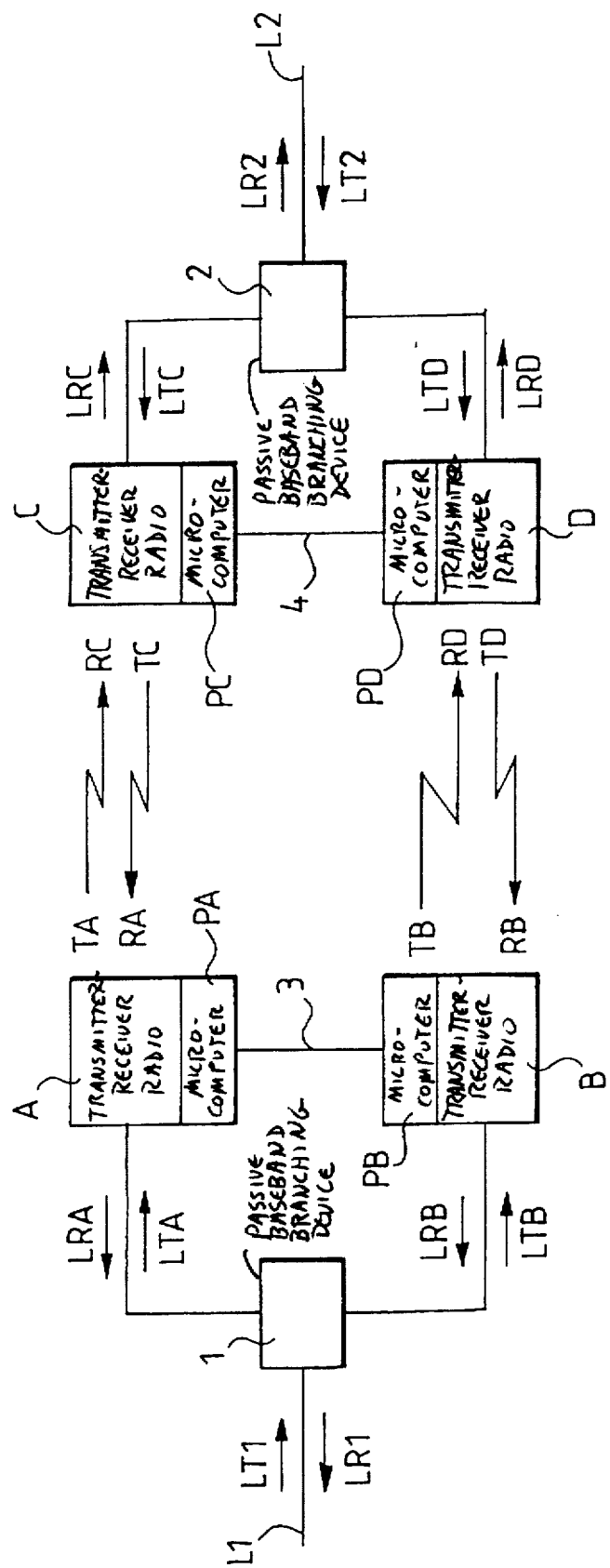
FIG. 1 shows two mutually communicating radio links forming part of a baseband network.

FIG. 1 shows a redundant system which comprises four identical transmitter-receiver radios A, B, C and D, which form two redundant pairs A, B and C, D; and two passive baseband branching means 1 and 2. The structure of suitable baseband branching means is described more closely e.g. in the Finnish Patent No. 87 123. A signal LT1 from a line L1 is branched in the baseband branching means 1 to the radio units A and B, while a signal LT2 from a line L2 is branched in the branching means 2 to the units C and D. Correspondingly, either one of signals RA or RB received by the radio unit A or B is selected through the branching means 1 as a signal LR1 to be transmitted to the line L1, and either one of signals RC or RD received by the radio unit C or D is selected through the branching means 2 as a signal LR2 to be transmitted to the line L2.

An in-built microcomputer or microprocessor PA, PB, PC, PD with its software takes care of the functions of each one of the radios. The redundant pairs A, B and C, D are interconnected by control buses 3 and 4. The microprocessors of the redundant pair communicate with each other over the control bus, the exchange of failure information forming part of the communication.

A changeover control algorithm according to the invention is based on two criteria:

deterioration of a signal from the transmission line at the near end (RXF=RX Failure), whereby the quality of the signal received from the transmission line is monitored; and a failure occurring at the far end in the transmission direction (FTXF=Farend TX Failure), whereby a possible failure indication or alarm signal concerning the transmission direction is monitored at the far end; this failure has thus already been detected in the failed far-end device itself and transmitted to the near end on a control channel multiplexed into a radio frame (e.g. 8-bit).

The algorithm, i.e. the software stored in the microcomputers PA to PD, performs at intervals a failure situation comparison between the mutually redundant receivers, on the basis of which the redundancy control of the baseband primary channel interfaces of the receivers is carried out by controlling the receive-direction output buffers so that the signal with higher quality of the received signals is forwarded towards the primary channel. If the failure situation comparison produces signals of equal quality, the receiver that transmits to the line is not changed. The changeover criteria may have different priorities; near-end failures (RXF) preferably have a higher priority than far-end failures (FTXF).

Propagation of a signal transmitted from one radio link to another will be described further below with reference to attached FIG. 1. It will suffice for the present purposes that the propagation of the signal is described in one direction only, in this specific case from the far end A, B to the near end C, D (LT1→LR2), as the reverse direction is functionally identical. As transmission and reception take place on different channels between A-C and B-D, the directions do not either affect each other.

The signal LT1 from the line L1 is divided in the passive baseband branching means 1, so that it has two propagation paths to the receiving radio link, in this case to the near end:

LT1→LTA→TA→RC; or

LT1→LTB→TB→RD.

The control of the receive-direction output buffers of the radio is used as the changeover device of the radio devices. It takes care that only one of the units of the redundant pair C and D at the near end is allowed to transmit its baseband output signal (LRC, LRD) through the baseband branching means 2 to the line. The microprocessors of the units select the unit which is allowed to transmit—C or D—on the basis of the failure situation analysis.

In practice, the software of one of the micro-processors of the redundant pair operates in a so-called Master state and the other in a so-called Slave state. Only the unit in the Master state is allowed to transmit a signal to the line as the LR2 signal. The failure situation analysis at the near end (analysing the quality of the output signals LRC and LRD) and the Master/Slave selection between the near-end units are performed in such a way that the unit in the Master state reads its own failure situation at predetermined intervals and asks for a similar situation from the unit in the Slave state through the control bus 4. The unit in the Master state performs the failure situation comparison, and, if it detects that the unit in the Slave state has more serious failures, that both units have equally serious failures, or that neither one of the units has failures, the unit in the Master state retains the changeover control, thus feeding a signal to the line. If the unit in the Master state detects that it has more serious failures than the unit in the Slave state, it performs the changeover of states in the following way: Master→Slave, Slave→Master, so that the unit or radio transmitting to the line also changes.

If the far-end A, B detects a failure in the transmission direction or knows that the outbound signal TA or TB is a failure or alarm signal (AIS), the corresponding receiving radio C or D is informed of the failure on a control channel multiplexed into the signal frame. Control channels between radio links are, as such, previously known, and will not be described more closely herein. According to the invention, however, the receiving radio reads the failure data by demultiplexing the control channel provided in the digital data transmission frame.

Information from the control channel is taken into account in the failure situation comparisons performed by the near-end Master unit. For instance, if C has been the Master unit and neither one of the redundant radios has failures, but the near end receives data indicating that the far-end unit A is faulty, the Master performs the Master/Slave change-over in the favour of unit D, so that the superior signal LRD produced by the link B-D is fed to the line LR2. With the markings used in the figure, the signal path LT1→LTA→TA→RC→LRC→LR2 thus changes into the signal path LT1→LTB→TB→RD→LRD→LR2. If the far-end failure occurred in unit B, no change is performed.

Signals shown in the drawing that so far have not been mentioned are related to an identical but reverse communication event where the optional paths for the signal are:

LT2→LTC→TC→RA→LRA→LR1, and

LT2→LTD→TD→RB→LRB→LR1; thus they are not significant for the understanding of the invention.

It is obvious to one skilled in the art that the different embodiments of the invention are not limited to the above example, but they may vary at will within the scope of the attached claims. Accordingly, the invention may be applied in any transmission device that uses a baseband branching means and a connection between far-end and near-end control means.

We claim:

1. A method for performing redundancy control of either of two respective baseband primary channel interfaces of respective pairs of mutually substantially identical receivers in a digital transmission system including a respective line serving each said interface and which when being used for transmitting serves as a far end of a transmission line for a primary channel and when being used for receiving serves as a near end of a transmission line for a primary channel, comprising the steps of:

monitoring the quality of a signal transmitted in a respective transmission direction and received by a respective said receiver interfaced to said system by a respective said baseband primary channel interface at a respective near end of the transmission line;

monitoring a possible failure indication or alarm signal concerning the respective transmission direction at the respective far end;

performing a failure situation comparison between the mutually redundant receivers of the respective said pair;

performing redundancy control of the baseband primary channel interface of the mutually redundant receivers of the respective pair on the basis of said failure situation comparison, so that the signal from the respective one of the receivers of the respective pair which provides a higher quality of output is transmitted in the respective said transmission direction towards the primary channel.

2. The method according to claim 1, further including:

transmitting said failure indication or alarm from the respective said far end to the respective said near end by radio in a control-channel frame.

3. The method according to claim 1 or 2, wherein:

in performing said redundancy control the quality of the received signal is given a higher priority than is a possible far-end failure indication or alarm signal.

4. A system for performing redundancy control of either of two respective baseband primary channel interfaces of respective pairs of mutually substantially identical receivers in a digital transmission system including a respective line serving each said interface and which when being used for transmitting serves as a far end of a transmission line for a primary channel and when being used for receiving serves as a near end of a transmission line for a primary channel, comprising:

a respective computer operatively associated with each said receiver;

a respective communication bus provided between the respective two said computers associated with said receivers of each said pair of receivers in order to enable monitoring of the quality of a signal received from the transmission line and a possible failure indication or alarm signal concerning the transmission direction at the far end of the transmission line, compare failure situations of the respective receivers, and perform redundancy control of the baseband primary channel interface of the respective receivers on the basis of said comparison of the failure situations and cause the signal with higher quality of output to be transmitted towards the primary channel in the respective said transmission direction.

5. The system according to claim 4, further comprising:
a control channel for receiving said failure indication or alarm from the respective said far end over a radio link.

6. The system according to claim 4 or 5, further comprising:
each said pair of receivers being connected to a common baseband branching means formed by respective passive components at respective ones of said interfaces.

* * * * *